United States Patent [19]

Nakanishi et al.

[11] 3,832,467

[45] Aug. 27, 1974

[54] INSECTICIDAL CHRYSANTHEMATE COMPOSITIONS AND THEIR METHOD OF USE

[75] Inventors: Michio Nakanishi; Toshihiko Mukai, both of Oita, Japan

[73] Assignee: Sumitomo Chemical Company, Limited, Higashi-ku, Osaka, Japan

[22] Filed: Sept. 7, 1972

[21] Appl. No.: 287,023

Related U.S. Application Data

[62] Division of Ser. No. 750,776, Aug. 7, 1968, Pat. No. 3,702,333.

[30] Foreign Application Priority Data

Aug. 11, 1967 Japan................................ 42-51511
Mar. 5, 1968 Japan................................ 43-14200

[52] U.S. Cl. ............................................... 424/285
[51] Int. Cl............................................... A01n 9/28
[58] Field of Search..................................... 424/285

[56] References Cited
UNITED STATES PATENTS 3,465,007 9/1969 Elliot .............................. 260/347.8
3,702,333 11/1972 Nakanishi et al................ 260/397.4

*Primary Examiner*—Albert T. Meyers
*Assistant Examiner*—Leonard Schenkman
*Attorney, Agent, or Firm*—Wenderoth, Lind & Ponack

[57] ABSTRACT

2-methyl-5-(2-propynyl)-3-furylmethyl 2,2,3,3-tetramethylcyclopropanecarboxylate and 2-methyl-5-(2-propynyl)-3-furylmethyl chrysanthemate are used to control insects.

2 Claims, No Drawings

INSECTICIDAL CHRYSANTHEMATE COMPOSITIONS AND THEIR METHOD OF USE

This is a division, of application Ser. No. 750,776, filed Aug. 7, 1968, now U.S. Pat. No. 3,702,333.

This invention relates to novel cyclopropanecarboxylic acid esters, insecticidal and miticidal compositions containing the same and the use thereof in the household, in horticulture and in agriculture.

More particularly, the said cyclopropanecarboxylic acid esters are of the formula

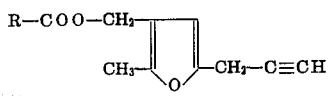
[I]

wherein R-COO- is chrysanthemoyloxy or 2,2,3,3-tetramethylcyclopropylcarbonyloxy.

Thus, more concretely, the cyclopropanecarboxylic acid esters are of the formulae:

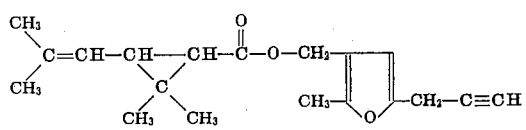
(Ia)

and

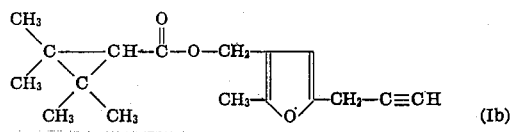
(Ib)

Naturally occurring pyrethrins are, in spite of their high insecticidal activity and low mammalian toxicity, expensive and in short supply. Allethrin, which is most popularly used among the various synthetic pyrethroids, is much inferior to pyrethrins in effectiveness.

Although many attempts have been made and proposed to overcome the aforesaid shortcoming and other disadvantages, no proposal, as far as the present inventors are aware, has been entirely successful.

The present inventors have succeeded in preparing novel cyclopropanecarboxylic acid esters of formula [I], finding that they show stronger insecticidal activity than allethrin and as low mammalian toxicity as naturally occurring pyrethrins.

The ester [I] can be prepared by conventional esterification from the corresponding acid or a functional derivative thereof such as an acid halide or a metal salt, on the one hand, and 2-methyl-5-(2-propynyl)-3-furylmethanol [II] or the corresponding halide on the other hand.

Thus, the ester [I] is prepared, for example, by reacting the corresponding acid chloride, namely chrysanthemoyl chloride or 2,2,3,3-tetramethylcyclopropylcarbonyl chloride, with alcohol [II]. After the reactants are mixed in a solvent such as a petroleum aliphatic hydrocarbon, benzene, toluene or dimethyl sulfoxide, in the presence of an acid acceptor such as pyridine, diethylaniline, triethylamine or potassium carbonate, at −20° to 30°C, the mixture is kept at room temperature (about 20° to 30°C) for 0.5 to 24 hours, and the mixture may then be heated at 60° to 80°C to complete the reaction.

The same ester [I] is prepared by the reaction of the corresponding acid anhydride with alcohol [II] in a solvent such as a petroleum aliphatic hydrocarbon, benzene, dimethylformamide or dimethyl sulfoxide, optionally in the presence of a base such as pyridine (also serving as solvent). The reactants are treated by the procedure described above.

Free chrysanthemic acid or 2,2,3,3-tetramethylcyclopropanecarboxylic acid may be heated with alcohol [II] in a solvent such as benzene or pyridine, in the presence of a catalyst such as boron trifluoride, p-toluenesulfonic acid or p-toluenesulfonyl chloride, at 25° to 100°C for 2 to 10 hours, to obtain the desired ester [I].

The ester exchange between methyl or ethyl ester of chrysanthemic acid or 2,2,3,3-tetramethylcyclopropanecarboxylic acid and alcohol [II] will also afford the desired ester [I]. The reactants are heated without solvent or in a solvent such as benzene, optionally in the presence of a catalyst such as potassium carbonate, sodium ethoxide or aluminum isopropoxide, under reduced pressure (e.g. 50 to 200 mmHg) or in a nitrogen atmosphere, at 60° to 160°C for 1 to 20 hours.

The ester [I] is also prepared by heating sodium salt of chrysanthemic acid or 2,2,3,3-tetramethylcyclopropanecarboxylic acid and 2-methyl-5-(2-propynyl)-3-furylmethyl chloride [III] in a solvent such as benzene, dimethylformamide, dimethyl sulfoxide or hexamethyl phosphoric triamide, optionally in the presence of triethylamine etc., at 60° to 100°C for 1 to 20 hours.

The starting materials [II] and [III] can be prepared e.g. as follows:

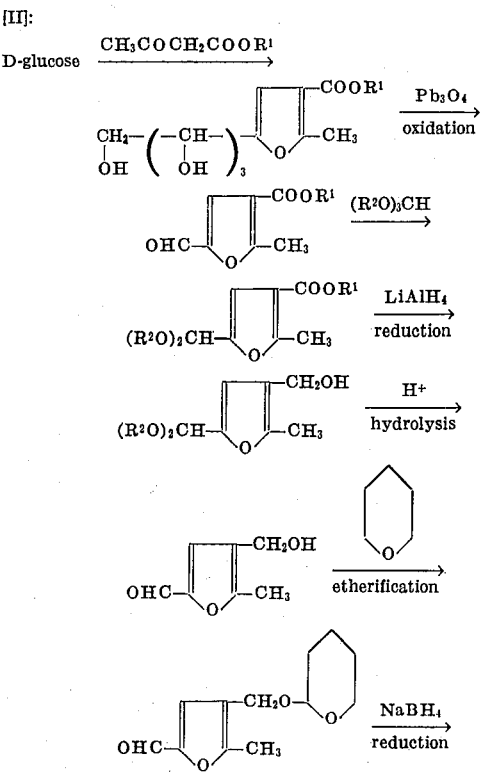

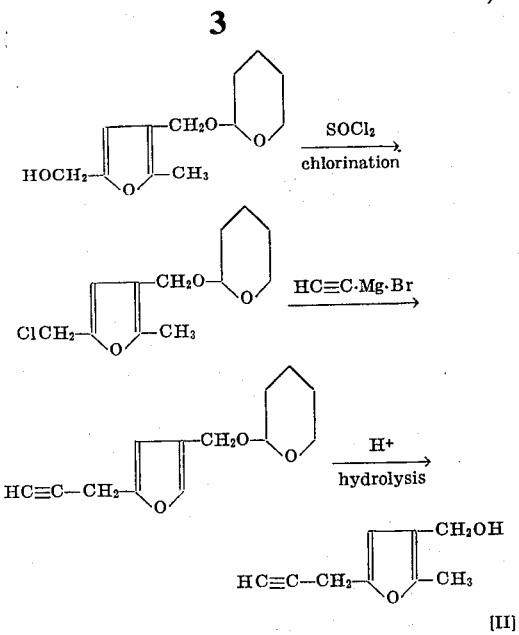

R¹, R²: lower alkyl]

[III]: 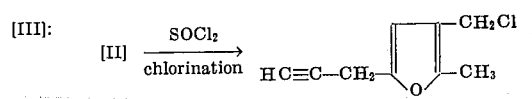

Presently preferred embodiments are illustrated in the following examples:

EXAMPLE 1

A solution of 1.6 grams of 2,2,3,3-tetramethylcyclopropylcarbonyl chloride in 3 milliliters of benzene is added dropwise with stirring and cooling into a solution of 1.5 grams of 2-methyl-5-(2-propynyl)-3-furylmethanol and 1.1 grams of pyridine in 6 milliliters of benzene. The mixture is kept at room temperature for 15 minutes with stirring. Then the mixture is poured into ice water and the whole is extracted with benzene. The benzene layer is washed with water and dried over anhydrous sodium sulfate. The benzene is distilled off under reduced pressure to give 2.4 grams of 2-methyl-5-(2-propynyl)-3-furylmethyl 2,2,3,3-tetramethylcyclopropanecarboxylate as a pale yellow oil showing $n_D^{20} = 1.4943$.

EXAMPLE 2

A solution of 3.2 grams of chrysanthemic anhydride and 1.5 grams of 2-methyl-5-(2-propynyl)-3-furylmethanol in 40 milliliters of toluene is heated under reflux for 4 hours in a nitrogen atmosphere. The reaction mixture is washed with ice-cooled 10% aqueous sodium carbonate solution to remove the chrysanthemic acid, a by-product. The toluene layer is washed with saturated sodium chloride solution and water, in this order, and dried over anhydrous sodium sulfate. Then the solvent is distilled off to give 2.5 grams of 2-methyl-5-(2-propynyl)-3-furylmethyl chrysanthemate as a yellowish brown oil. It is purified by column chromatography (chloroform eluant; silicic acid column) to yield a yellow transparent oil showing $n_D^{20} = 1.5022$.

EXAMPLE 3

A mixture of 1.42 grams of 2,2,3,3-tetramethylcyclopropanecarboxylic acid, 1.5 grams of 2-methyl-5-(2-propynyl)-3-furylmethanol, 30 milliliters of benzene and 0.5 gram of p-toluenesulfonic acid is heated under reflux in a nitrogen atmosphere. After the azeotropic removal of the theoretical amount of water with benzene, the benzene solution is washed with 10 percent aqueous potassium carbonate solution and water, in this order, and dried over anhydrous sodium sulfate. The solvent is distilled off to give 2.3 grams of 2-methyl-5-(2-propynyl)-3-furylmethyl 2,2,3,3-tetramethylcyclopropanecarboxylate as a pale yellowish brown oil showing $n_D^{20} = 1.4945$.

EXAMPLE 4

A mixture of 1.96 grams of ethyl 2,2,3,3-tetramethylcyclopropanecarboxylate, 1.5 grams of 2-methyl-5-(2-propynyl)-3-furylmethanol and 0.5 gram of potassium carbonate is heated at 100° to 120°C under reduced pressure of 100 to 150 mmHg for 4 hours. Then the mixture is extracted with benzene, the extract is washed with water and the benzene is distilled off. There is obtained 1.2 grams of 2-methyl-5-(2-propynyl)-3-furylmethyl 2,2,3,3-tetramethylcyclopropanecarboxylate as a yellowish brown oil showing $n_D^{20} = 1.4941$.

EXAMPLE 5

A mixture of 1.9 grams of sodium chrysanthemate, 1.54 grams of 2-methyl-5-(2-propynyl)-3-furylmethyl chloride and 50 milliliters of benzene is heated under reflux for 3.5 hours in a nitrogen atmosphere. The mixture is cooled and the precipitate of sodium chloride is filtered off. Then the filtrate is washed with saturated aqueous sodium chloride solution and water, in this order, and dried over anhydrous sodium sulfate and the solvent is distilled off. There is obtained 2.5 grams of 2-methyl-5-(2-propynyl)-3-furylmethyl chrysanthemate as a pale yellow transparent oil showing $n_D^{28} = 1.5020$.

The novel cyclopropanecarboxylic acid esters of the invention can control various household, horticultural and agricultural pests such as flies, mosquitoes, cockroaches, fleas, lice, aphids, beetles, scales, tortrices, worms, mites, weevils, moths, hoppers, leafhoppers, caterpillars, bugs, chafers, rollers and locusts.

A pesticidal composition of the present invention can be prepared, for example, by dissolving or dispersing the ester [I] in a suitable solid carrier (e.g. dilvent, dust diluent, etc.) or allowing the same compound to be adsorbed thereon.

If desired, the compositions can be further admixed with emulsifiers, dispersing agents, suspension aids, penetrating agents, wetting agents, thickeners, stabilizers, etc., to prepare solutions, emulsions wettable powders, dusts, granules, aerosols, mosquito coils, baits, sprays and the like.

Moreover, it is advantageous that the composition contains an extender of the activity, such as N-(2-ethylhexyl)-1-isopropyl-4-methyl-bicyclo[2,2,1]hept-5-ene-2,3-dicarboximide, α-[2-(2-butoxyethoxy)ethoxy]-4,5-methylenedioxy-2-propyltoluene, 1,2-methylenedioxy-4-[2-(octylsulfinyl)-propyl]benzene, dipropyl 3-methyl-6,7-methylenedioxy-1,2,3,4-tetrahydro-naphthalene-1,2-dicarboxylate, 4-(3,4-methylenedioxyphenyl)-5-methyl-1,3-dioxane, bis(2,3,3,3-tetrachloropropyl)ether, isobornyl thiocyanatoacetate, 2-(3,4-methylenedioxyphenoxy)-3,6,9-trioxaundecane and piperonal bis [2-(2-butoxyethoxy) ethyl]acetal.

Generally speaking, a suitable concentration of the effective component ranges from 0.001 to 50 percent by weight, more advantageously about 0.001 to 2 percent by weight in the case of a spray, an aerosol, a suspension, an emulsion or an oil-base formulation; from about 0.01 to about 5 percent by weight in the case of a dust agent; and from 10 to 50 percent by weight in the case of an emulsifiable concentrate or a wettable powder.

However, the said ranges can be modified as desired according to particular applications.

Solvents which can be successfully employed for the compositions of the present invention include, for example, water, alcohols (e.g. methyl alcohol, ethyl alcohol, ethylene glycol, etc.), ketones (e.g. acetone, methyl ethyl ketone, etc.), ethers (e.g. dioxane, tetrahydrofuran, cellosolve, etc.), aliphatic hydrocarbons (e.g. gasoline, kerosene, machine oil, fuel oil, etc.), aromatic hydrocarbons (e.g. benzene, toluene, xylene, solvent naphtha, methylnaphthalene, etc.), organic bases (e.g. pyridine, collidine, etc.), acid amides (e.g. dimethylformamide, etc.), esters (e.g. ethyl acetate, etc.), nitriles (e.g. acetonitrile, etc.) and the like. Such solvents can be employed either singly or in combinations.

As the said diluent, adulterant, etc., vegetable powders (e.g. soybean powder, tobacco powder, walnut powder, wood flour, flour, charcoal powder, pyrethrum marc, etc.), mineral powders (e.g. clays such as kaolin, bentonite, acid clay, etc., talc such as talc, soapstone, etc., and silicas such as diatomaceous earth, mica powder, etc.), as well as alumina, silica gel, sulfur powder, active carbon, etc., can be successfully employed either singly or in various combinations.

The surface active agents to be employed as emulsifier, penetrating agent, dispersing agent, solubilizing agent, etc. mentioned hereinbefore are exemplified by soaps, the sulfuric acid esters of higher alcohols, olefin sulfates, sulfated oils, ethanolamine, higher fatty acid esters, alkylarylsulfonates, quaternary ammonium salts, alkyleneoxide type activating agent, anhydrosorbitol type activating agents, and the like.

In addition to the agents mentioned above, it is also possible for the purpose stated in the foregoing, to employ, if required, such substances as casein, gelatin, agar, starch, bentonite, aluminum hydroxide, etc.

To these preparations, there can be further added insecticides such as pyrethrins, allethrin, organophosphorus insecticides, chlorinated hydrocarbon insecticides and carbamate insecticides as well as fungicides, miticides, fertilizers, etc., which are to be construed as a part of the carrier or adjuvant in the composition of the present invention.

Formulation 1 (Emulsifiable concentrate)

|  | parts by weight |
|---|---|
| ester [Ia] or [Ib] | 10 |
| polyoxyethylene nonylphenyl ether | 10 |
| xylene | 40 |
| kerosene | 40 |

The emulsifiable concentrate is practically applied in the form of its 20 to 200 times aqueous dilution for getting rid of mites, cockroaches, beetles, houseflies or mosquitoes.

Formulation 2 (Oil-base formulation)

|  | parts by weight |
|---|---|
| ester [Ia] or [Ib] | 0.2 |
| 2,6-di-tert-butyl-p-cresol | 0.2 |
| α-[2-(2-butoxyethoxy)ethoxy]-4,5-methylenedioxy-2-propyltoluene | 2 |
| methylnaphthalene | 47.6 |
| kerosene | 50 |

The oil-base formulation is applied in the fields as it is, in a ratio of 10 to 20 liters per are, for getting rid of moths, hoppers or caterpillars.

FORMULATION 3 (DUST)

Ester [Ia] or [Ib] (0.3 part by weight) is dissolved in 10 parts by weight of methanol, the solution is mixed with 30 parts by weight of pyrethrum marc and 69.7 parts by weight of talc (200 to 300 mesh), and the whole is dried.

The dust agent is homogeneously applied to plants, etc. as it is, in a ratio of 0.3 to 0.6 kg/are, for destroying lice, fleas, bugs, worms or moths.

FORMULATION 4 (MOSQUITO COIL)

Ester [Ia] or [Ib] (0.7 part by weight) is dissolved in 5 parts by weight of methanol, the solution is mixed with 46.3 parts by weight of wood flour and 50 parts by weight of pyrethrum marc, 100 parts by weight of water and 3 parts by weight of starch are added, and the whole is kneaded, formed into coils and dried.

Formulation 5 (Aerosol)

|  | parts by weight |
|---|---|
| ester [Ia] or [Ib] | 0.5 |
| bis(2,3,3,3-tetrachloropropyl) ether | 3 |
| xylene | 6.5 |
| kerosene | 10 |
| propellant | 80 |

The aerosol is applied for exterminating houseflies, mosquitoes, cockroaches and so on.

Formulation 6 (Wettable powder)

|  | parts by weight |
|---|---|
| ester [Ia] or [Ib] | 10 |
| polyoxyethylene nonylphenyl ether | 10 |
| acid clay | 80 |

The wettable powder is practically applied in a form of 10 to 100 times aqueous suspension for getting rid of aphids or cockroaches.

TEST 1

One milliliter of an acetone solution containing ester [Ia] or [Ib] at a given concentration is spread on the bottom of a petri dish (9 cm diameter) and air-dried. Ten houseflies *Musca domestica vicina* Takatsuki strain (3 to 4 days after emergence) are brought into contact with the insecticide on the bottom. Median knock down time ($KT_{50}$) in minutes (min.) and mortality in 24 hours are as follows:

| Insecticide | Concentration % by weight | $KT_{50}$ (min.) | Mortality (%) |
| --- | --- | --- | --- |
| Ester [Ia] | 0.0025 | 8.8 | 100 |
| Ester [Ib] | 0.0025 | 3.2 | 100 |
| Allethrin | 0.0025 | 12.0 | 33 |

TEST 2

Median lethal dose ($LD_{50}$) against the housefly (Takatsuki strain, male and female) is determined by a topical application method using acetone solution as follows:

| | |
| --- | --- |
| Ester [Ia] | 0.390 gamma/fly |
| Ester [Ib] | 0.281 gamma/fly |
| Allethrin | 0.830 gamma/fly |

TEST 3

The mosquito coil without active ingredient with the cross-section area of 0.3 × 0.3 cm is soaked for 30 minutes in an acetone solution of ester [Ia] or [Ib] at 0.1 percent concentration and air-dried and cut into sticks of 6 cm length.

Through the central hole of the bottom of a glass cylinder (20 cm in inner diameter, 43 cm high) containing 20 adult houseflies (Takatsuki strain), the stick of the mosquito coil giving off smoke is put into the cylinder. $KT_{50}$ and mortality in 24 hours is determined as follows:

| Insecticide | $KT_{50}$ (min.) | Mortality (%) |
| --- | --- | --- |
| Ester [Ia] | 7.3 | 100 |
| Ester [Ib] | 7.6 | 100 |
| Allethrin | 16.9 | 30 |

What is claimed is:

1. An insecticidal composition containing as the active ingredient from about 0.001 to about 50 percent by weight of a compound of the formula:

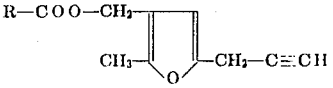

wherein R-COO— is chrysanthemoyloxy or 2,2,3,3-tetramethylcyclopropylcarbonyloxy, and an insecticidal carrier therefor.

2. A method of controlling insects which comprises bringing them into contact with an insecticidally effective amount of a compound of the formula:

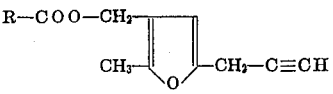

wherein R-COO— is chrysanthemoyloxy or 2,2,3,3-tetramethylcyclopropylcarbonyloxy.

* * * * *